Sept. 9, 1947.　　　　T. K. COX　　　　2,427,196
BONDING OF VULCANIZABLE COMPOSITIONS TO METALLIC SURFACES
Filed Aug. 18, 1942
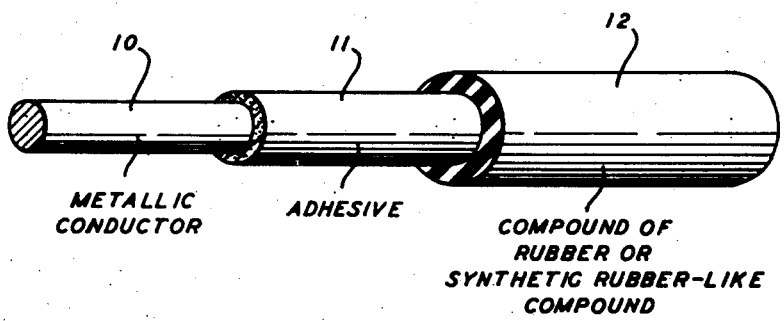
INVENTOR
T. K. COX
BY
ATTORNEY Patented Sept. 9, 1947

2,427,196

UNITED STATES PATENT OFFICE 2,427,196

BONDING OF VULCANIZABLE COMPOSITIONS TO METALLIC SURFACES

Thomas K. Cox, Randallstown, Md., assignor to Western Electric Company, Incorporated, New York, N. Y., a corporation of New York Application August 18, 1942, Serial No. 455,203

14 Claims. (Cl. 174—120)

This invention relates to the production of composite articles, and more particularly to methods of and adhesives for adhering a vulcanizable compound to metal.

In the production of insulated electrical conductors for certain uses, it is desirable to obtain adhesion between the metallic core and the insulation applied thereover. The degree of adhesion desired will vary with the use to which the insulated conductor is to be put, but in general the mere vulcanization of vulcanizable insulating compounds does not provide the necessary degree of adhesion between the vulcanizable compound and the metallic core.

Objects of this invention are to provide composite articles and more particularly to provide methods of and adhesives for adhering a vulcanizable compound to metal.

In general, the invention comprises applying an ester to a metallic surface, placing an unvulcanized vulcanizable compound in contact therewith, and then vulcanizing the vulcanizable compound under heat and pressure to cause it to adhere to the metallic surface.

Other features and advantages of the invention will become apparent from the following detailed description of one embodiment thereof, when read in conjunction with the accompanying drawing, in which the single figure discloses a schematic perspective view of an insulated electrical conductor.

In the particular embodiment of the invention shown in the accompanying drawing, a metallic conductor 10 is covered with a thin film 11 which comprises a compound of the class known as esters. The film 11 is of such a thickness as to be almost imperceptible to the naked eye. Therefore, the film 11 shown in the accompanying drawing is purely a schematic representation and is not meant to show the true thickness of this film. A layer 12 of vulcanizable material is applied over the ester film 11 and vulcanized in situ under heat and pressure. The layer 12 of vulcanizable material may be applied over the ester film in any one of several known ways, but in this particular embodiment of the invention the vulcanizable material is extruded over the adhesive film 11 to form the layer 12. The vulcanizable material of which layer 12 is composed may be either a rubber compound or a synthetic rubber-like compound. A particular synthetic rubber-like compound that has been found suitable for purposes of this invention contains polymerized chloroprene as the vulcanizable ingredient. Polymerized chloroprene is sold under the trade name "neoprene" by E. I. du Pont de Nemours & Company.

"Neoprene" does not vulcanize in the same sense that rubber compounds vulcanize, but, as used in this application, the term "vulcanize" is meant to include the reaction of such synthetic rubber-like compounds when subjected to heat and pressure.

The adhesive film 11 may be composed of any one of a large number of esters. Among the esters that have been found suitable for purposes of this invention are dibutyl phthalate, tricresyl phosphate, amyl acetate, ethyl acetate, butyl acetate, ethyl acetoacetate, methyl salicylate, methyl benzoate, triethylene-glycol-di-2-ethyl butyrate, and triethylene-glycol-di-2-ethyl hexoate. All of these compounds are esters, but they are of widely different types. For example, tricresyl phosphate may be designated an aryl ester of an inorganic acid; dibutyl phthalate, methyl salicylate and methyl benzoate are esters of aromatic acids; ethyl acetoacetate in one of its tautomeric forms is an inner ester of an aliphatic acid; amyl acetate, ethyl acetate and butyl acetate are esters of straight chain, aliphatic acids; and triethylene-glycol-di-2-ethyl butyrate and triethylene-glycol-di-2-ethyl hexoate are high molecular weight esters of aliphatic acids. The above named esters may be applied to the metallic conductor 10 in any suitable manner, and may be employed separately or in combination with other esters. If desired, the esters may be dissolved or diluted by suitable solvents or diluents so that the resulting solutions are freely fluid before being applied to the metallic conductor 10.

The degree of adhesion between the metallic conductor 10 and the layer 12 varies with the ester used and the conditions under which the layer 12 is vulcanized. All of the above named esters produce a sufficient degree of adhesion between layer 12 and the metallic conductor 10 to prevent longitudinal movement of the layer 12 along the metallic conductor 10. Certain of the esters such as tricresyl phosphate and dibutyl phthalate will bond the vulcanizable layer 12 to the metallic conductor 10 so that their contacting surfaces cannot be clearly separated, when the layer 12 is vulcanized under sufficient heat and pressure. Amyl acetate produces adhesion between the metallic surface and the vulcanizable layer 12, but the two may be separated cleanly. By mixing bond-forming esters, such as tricresyl phosphate and dibutyl phthalate, with mere adhesion producing esters, such as amyl acetate, the degree of adhesion between the metallic conductor and the layer 12 may be regulated to a certain extent.

This invention is not limited to the art of covering metallic conductors, but is applicable whenever it is desired to obtain adhesion between a rubber compound or a rubber-like compound surface and a metallic surface.

What is claimed is:

1. The method of adhering a vulcanizable composition surface to a metallic surface, which comprises coating the metallic surface with a thin film whose sole active ingredient is an ester of the group consisting of dibutyl phthalate, tricresyl phosphate, amyl acetate, ethyl acetate, butyl acetate, ethyl acetoacetate, methyl benzoate, methyl salicylate, triethylene-glycol-di-2-ethyl butyrate, and triethylene-glycol-di-2-ethyl hexoate, positioning the vulcanizable composition surface in contact with the film, and vulcanizing the vulcanizable composition surface in situ under heat and pressure, the vulcanizable composition containing as its essential vulcanizable constituent material of the group consisting of rubber and polymerized chloroprene.

2. The method of adhering a vulcanizable rubber composition surface to a metallic surface, which comprises coating the metallic surface with a thin film whose sole active ingredient is an ester of the group consisting of dibutyl phthalate, tricresyl phosphate, amyl acetate, ethyl acetate, butyl acetate, ethyl acetoacetate, methyl benzoate, methyl salicylate, triethylene-glycol-di-2-ethyl butyrate, and triethylene-glycol-di-2-ethyl hexoate, positioning the unvulcanized rubber composition in contact with the film, and vulcanizing the rubber composition in situ under heat and pressure.

3. The method of adhering to a metallic surface a vulcanizable synthetic rubber-like composition surface containing polymerized chloroprene as the vulcanizable constituent, which comprises coating the metallic surface with a thin film whose sole active ingredient is an ester of the group consisting of dibutyl phthalate, tricresyl phosphate, amyl acetate, ethyl acetate, butyl acetate, ethyl acetoacetate, methyl benzoate, methyl salicylate, triethylene-glycol-di-2-ethyl butyrate, and triethylene-glycol-di-2-ethyl hexoate, positioning the synthetic rubber-like composition surface in contact with the film, and vulcanizing the synthetic rubber-like composition surface in situ under heat and pressure.

4. The method of producing an insulated electrical conductor, which comprises coating a metallic conductor with a thin film whose sole active ingredient is an ester of the group consisting of dibutyl phthalate, tricresyl phosphate, amyl acetate, ethyl acetate, butyl acetate, ethyl acetoacetate, methyl benzoate, methyl salicylate, triethylene-glycol-di-2-ethyl butyrate, and triethylene-glycol-di-2-ethyl hexoate, extruding a layer of an unvulcanized rubber composition over the ester film, and vulcanizing the rubber composition in situ.

5. An insulated electrical conductor, which comprises a metallic conductor, a thin film consisting of an ester of the group consisting of dibutyl phthalate, tricresyl phosphate, amyl acetate, ethyl acetate, butyl acetate, ethyl acetoacetate, methyl benzoate, methyl salicylate, triethylene-glycol-di-2-ethyl butyrate, and triethylene-glycol-di-2-ethyl hexoate covering the metallic conductor, and a layer of vulcanized, synthetic rubber-like composition in which polymerized chloroprene is the synthetic rubber-like constituent surrounding the film, said ester film having been applied between the metallic conductor and the synthetic rubber-like layer prior to the vulcanization of the latter.

6. The method of producing an insulated electrical conductor, which comprises coating a metallic conductor with a thin film consisting of dibutyl phthalate, extruding a layer of unvulcanized rubber composition over the film, and vulcanizing the rubber composition in situ.

7. The method of producing an insulated electrical conductor, which comprises coating a metallic conductor with a thin film consisting of tricresyl phosphate, extruding a layer of unvulcanized rubber composition over the film, and vulcanizing the rubber composition in situ.

8. The method of producing an insulated electrical conductor, which comprises coating a metallic conductor with a thin film consisting of amyl acetate, extruding a layer of unvulcanized rubber composition over the film, and vulcanizing the rubber composition in situ.

9. An insulated electrical conductor which comprises a metallic conductor, a thin film consisting of dibutyl phthalate covering the metallic conductor, and a layer of a vulcanized rubber compound surrounding the film, said film having been applied between the metallic conductor and the rubber composition prior to the vulcanization of the latter.

10. An insulated electrical conductor which comprises a metallic conductor, a thin film consisting of tricresyl phosphate covering the metallic conductor, and a layer of a vulcanized rubber compound surrounding the film, said film having been applied between the metallic conductor and the rubber composition prior to the vulcanization of the latter.

11. An insulated electrical conductor which comprises a metallic conductor, a thin film consisting of amyl acetate covering the metallic conductor, and a layer of a vulcanized rubber compound surrounding the film, said film having been applied between the metallic conductor and the rubber composition prior to the vulcanization of the latter.

12. A composite article which comprises a metal body, a thin film consisting of an ester of the group consisting of dibutyl phthalate, tricresyl phosphate, amyl acetate, ethyl acetate, butyl acetate, ethyl acetoacetate, methyl benzoate, methyl salicylate, triethylene-glycol-di-2-ethyl butyrate, and triethylene-glycol-di-2-ethyl hexoate covering a portion of the metallic body, and a layer of a vulcanized rubber compound surrounding the ester film, said ester film having been applied between the metallic body and the layer of rubber compound prior to the vulcanization of the latter.

13. An insulated electrical conductor, which comprises a metallic conductor, a thin film consisting of an ester of the group consisting of dibutyl phthalate, tricresyl phosphate, amyl acetate, ethyl acetate, butyl acetate, ethyl acetoacetate, methyl benzoate, methyl salicylate, triethylene-glycol-di-2-ethyl butyrate, and triethylene-glycol-di-2-ethyl hexoate covering the metallic conductor, and a layer of vulcanized, rubber composition surrounding the film, said ester film having been applied between the metallic conductor and the rubber composition layer prior to the vulcanization of the latter.

14. A composite article which comprises a metal body, a thin film consisting of an ester of the group consisting of dibutyl phthalate, tricresyl phosphate, amyl acetate, ethyl acetate, butyl acetate, ethyl acetoacetate, methyl benzoate, methyl salicylate, triethylene-glycol-di-2-ethyl butyrate, and triethylene-glycol-di-2-ethyl hexoate covering a portion of the metallic body, and a layer of a vulcanized composition containing as its essential vulcanized constituent material of the group consisting of rubber and polymerized chloroprene surrounding the ester film, said ester film having been applied between the metallic body and the layer of rubber compound prior to the vulcanization of the latter.

THOMAS K. COX.

REFERENCES CITED

The following references are of record in the file of this patent:

UNITED STATES PATENTS

| Number | Name | Date |
|---|---|---|
| 1,894,644 | Sturdevant | Jan. 17, 1933 |
| 2,147,620 | Winkelmann | Feb. 14, 1939 |
| 1,919,718 | Gray | July 25, 1933 |
| 2,226,541 | Browne | Dec. 31, 1940 |

FOREIGN PATENTS

| Number | Country | Date |
|---|---|---|
| 298,318 | Great Britain | Oct. 11, 1928 |

OTHER REFERENCES

Transactions Institution of the Rubber Industry, Aug. 1937, vol. 13, page 150.

The India Rubber Journal, pages 784–786, May 31, 1930.